United States Patent [19]

Joyce et al.

[11] 4,087,857
[45] May 2, 1978

[54] ROM-INITIALIZING APPARATUS

[75] Inventors: Thomas F. Joyce, Burlington; Michel M. Raguin, Medford, both of Mass.

[73] Assignee: Honeywell Information Systems Inc., Waltham, Mass.

[21] Appl. No.: 729,066

[22] Filed: Oct. 4, 1976

[51] Int. Cl.² ............................................. G06F 9/16
[52] U.S. Cl. .................................................. 364/200
[58] Field of Search ........................................ 364/200

[56] References Cited

U.S. PATENT DOCUMENTS

| | | | |
|---|---|---|---|
| 3,736,567 | 5/1973 | Lotan et al. | 340/172.5 |
| 3,859,636 | 1/1975 | Cook | 340/172.5 |
| 3,972,028 | 7/1976 | Weber et al. | 340/172.5 |
| 3,972,029 | 7/1976 | Bailey, Jr. | 340/172.5 |
| 3,972,030 | 7/1976 | Bailey, Jr. | 340/172.5 |
| 3,979,725 | 9/1976 | Disparte et al. | 340/172.5 |
| 3,980,991 | 9/1976 | Mercurid | 340/172.5 |
| 3,989,800 | 9/1975 | Recks et al. | 340/172.5 |
| 4,021,779 | 5/1977 | Gardner | 340/172.5 |
| 4,038,643 | 7/1977 | Kim | 364/200 |

Primary Examiner—Gareth D. Shaw
Assistant Examiner—C. T. Bartz
Attorney, Agent, or Firm—Nicholas Prasinos; Ronald T. Reiling

[57] ABSTRACT

A method and an apparatus for improving the speed of executing instructions and reducing the microprogram memory requirements in a conventional digital computer system by eliminating a ROM address register for addressing microwords. The method or apparatus incorporates the use of a predetermined bit position in the microinstruction word which is set to a binary one when the microword is the last microword of an executing microprogram. The apparatus is responsive to the electronic representation of the binary one signal to cause the microinstruction execution sequence to branch to a predetermined location in the microprogram memory for execution of the following microinstruction; thus eliminating one ROM address register and at least one step in returning to a common address for starting the execution of another microprogram.

7 Claims, No Drawings

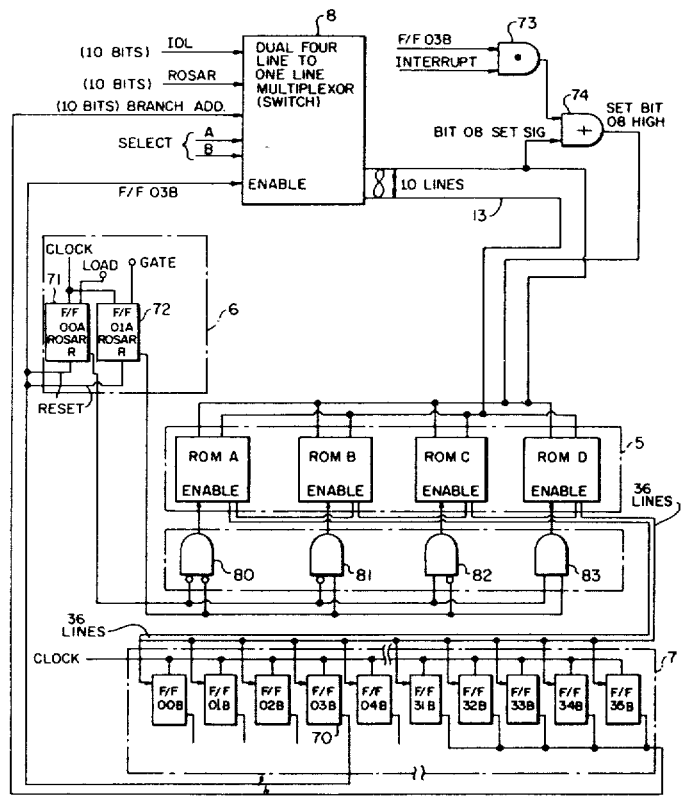

ROM-INITIALIZING APPARATUS

RELATED APPLICATIONS

The following application assigned to the same assignee as the instant application is related to the instant application:
1. "Microprogram Splatter Return Apparatus" by Thomas F. Joyce and Micheal M. Raguin, filed on Oct. 4, 1976 and having U.S. Ser. No. 729,065.

BACKGROUND OF THE INVENTION

1. Field of the Invention

This invention relates to data processing systems and more particularly to an improved microprogram control unit.

2. Description of the Prior Art

In the early 1950's, M. V. Wilkes delivered at the Manchester University Computer Inaugural Conference, July, 1951, pages 16-18, a paper entitled "The Best Way to Design an Automatic Calculating Machine" in which he proposed a computer which would have a variable-instruction set. Normally a fixed set of instructions is available to the programmer, each one composed of a succession of elementary operations or micro-operations. The implementation of micro-operations constitutes the design of the variable-instruction machine. For each instruction, the micro-operation sequence ($\mu$-op) is usually fixed in computer hardward design. What Wilkes proposed was a means by which a programmer could assemble $\mu$-ops into any instruction the computer was inherently capable of executing. With microprogramming, a machine's instruction repertoire could be altered from day-to-day as its applications vary.

As a means for implementing a variable-instruction repertoire, the need for a memory to store the $\mu$-op sequence was postulated, and Wilkes proposed the use of a diode matrix. In today's technology, we refer to this device as a read-only memory (ROM) or non-destructive read-out memory. The latter term is more appropriate since the variable instruction repertoire presupposes the ability to change the memory's contents; however, the former term is in common usage, so we will use it here. In any event, we are referring to a memory which can be altered by a microprogrammer, but (usually) not by the machine.

The device that performs the $\mu$-op sequencing in a computer is usually referred to as the control element. In talking about the ROM control elements, we will be referring to a plurality of rectangular memory arrays with a specific number of words in each rectangular memory, each word consisting of a predetermined number of bits. All bits of a word are read out together, and they cumulatively specify a set of $\mu$-ops to be executed either simultaneously or sequentially as specified by an external clock. Thereafter, another word is read out and executed in similar fashion and so on. Each word specifies a set of $\mu$-ops; and a sequence of words specifies a sequence of sets of $\mu$-ops. A set of words whose $\mu$-ops define (or execute) some specified function is called a microprogram. In today's technology, a variety of devices are being used to create a ROM control element; however, semi-conductor devices are fast replacing all other types.

In its most simple usage, each bit of a microword is used to generate one $\mu$-op; hence, a bit position in the word will contain a one as the corresponding $\mu$-op is desired in that word, otherwise it will be zero. These microwords are stored in the read-only memory (ROM). An instruction read out of main memory initiates the first of a series of microwords to be read out of the ROM to cause the CPU of the computer system to execute the instruction read out from main memory.

These techniques are well known and described fully in a book entitled "Microprogramming: Principles and Practices", by Samir S. Husson, published in 1970 by Prentice-Hall Inc., of Englewood Cliffs, N.J. Additionally, several patents have issued on various features of microprogramming including a U.S. Pat. No. 3,736,567 issued on May 29, 1973 which features a technique wherein a predetermined bit in the last microword of a microprogram initiates a new program memory cycle and a new microprogram memory cycle.

Read only memories are in extensive use today in most computer systems, some typical ones being the Honeywell Model 4200/8200, the Honeywell Series 60, the IBM 360 Series and the IBM 370 Series computer systems.

More recently, the ROM has been incorporated into minicomputers for controlling the execution of instructions. However, the minicomputer business is very competitive in terms of price and performance. Two primary demands compatible with the lowest cost have surfaced on the market-place. One is to provide a greater "throughput capability"; while another is to provide broader capability for providing a broader spectrum of services to the user. These requirements translated to one broad general requirement — maximum data handling capabilities with minimum hardware requirements. Accordingly, the computer designer is faced with the problem of reducing the ultimate cost of the computer system while at the same time increasing capabilities of the computer system. These requirements act in opposition to each other. Generally, additional features and capabilities require increased hardware which translates to increased cost; whereas reducing costs translates to a reduced number of features and capabilities by reducing hardware.

Although ROM's have been introduced into minicomputers for controlling the execution of instructions through the use of microprogramming and microinstructions, efforts are continuing in order to provide a more efficient ROM for executing instructions by reducing hardware, conserving read only memory or steps in the execution of an instruction. Prior art ROM's use a ROM address register to address microwords in ROM which store microinstructions having a branch order after a microprogramming sequence is complete in order to return to a common point to start the next instruction microprogramming sequence. Accordingly, depending in what bank of the ROM the last microinstruction of an executing microprogramming sequence is in, not only is there a waste of at least one and as many as two steps but additional hardware in the form of a ROM address register is required.

What is needed in order to save hardware and steps in commencing the execution of a new instruction (not micro-instruction), is the elimination of a ROM address register and for the need to branch to a common starting point.

OBJECTS OF THE INVENTION

It is a primary object of the invention therefore to provide a means for ensuring maximum data handling capabilities at minimum cost.

It is another primary object of the invention to provide an improved ROM system.

It is still a further object of the invention to provide a ROM system that eliminates the need for a ROM address register and for a branch to a common point in commencing the execution of a new instruction.

It is yet another object of the invention to provide apparatus responsive to a predetermined bit position of a microword of a ROM for initializing the ROM system to a zero address.

It is still a further object of the invention to provide apparatus responsive to a predetermined bit position of a microword in a microprogramming sequence for initializing a ROM address to either zero or eight depending on whether or not there was an external interrupt during the microprogramming sequence.

SUMMARY OF THE INVENTION

In accordance with the above and other objects of the invention, a predetermined bit position of a microword utilized in a microprogram is reserved for storing a signal to indicate whether or not that microword is the last in a microprogramming sequence. Storing a zero or low signal indicates that it is not the last microword whereas storing a one or high signal indicates that it is the last microword in the microprogramming sequence. Apparatus is provided to sense the state of this bit position, and to take appropriate action to initialize the ROM system to a zero address if the microword in which the bit is set is in fact the last microword in the instruction sequence and no interrupt is indicated. If the predetermined bit position is set to a one or high signal but an interrupt signal is also present, apparatus is further provided to initialize the system to the interrupt state by automatically providing the starting address of the microprogram sequence for handling interrupts.

BRIEF DESCRIPTION OF THE DRAWIGS

DESCRIPTION OF THE PREFERRED EMBODIMENT OF THE INVENTION General

Figure 1:
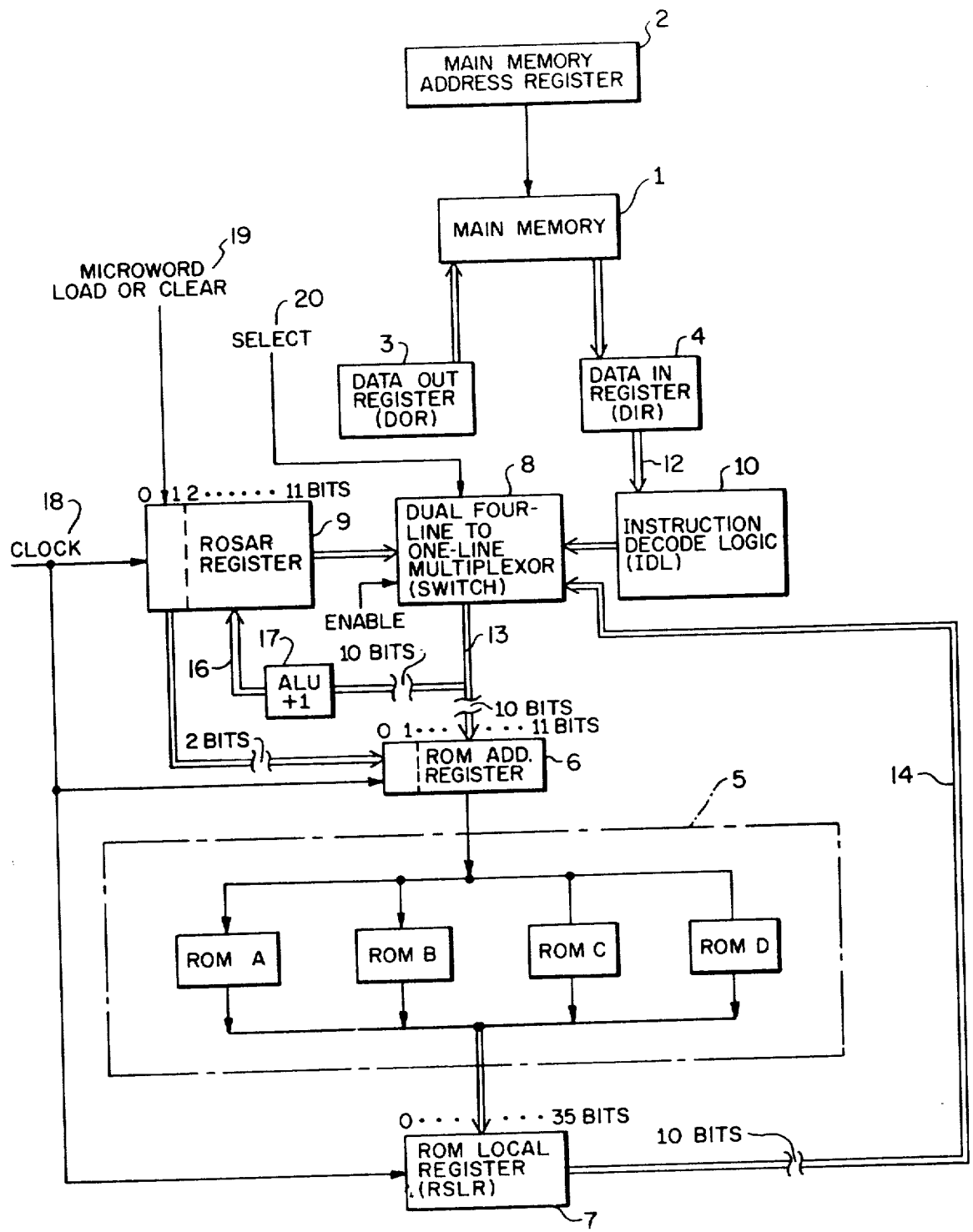
FIG. 1 is a block diagram of the pertinent parts of a prior art main memory (MM) subsystem and a read-only memory (ROM) subsystem.
Figure 4A:
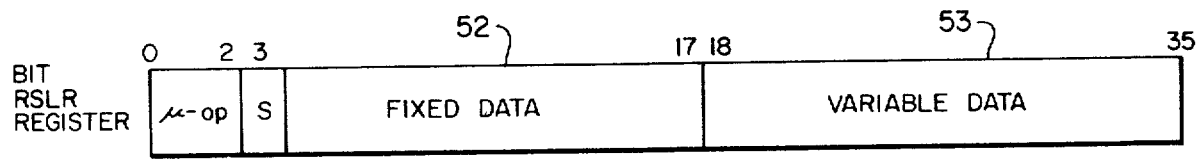
Figure 4B:
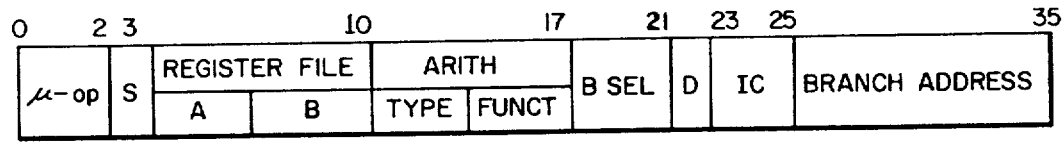

In order to best understand the differences between the features of the claimed invention and those of the prior art, the prior art will be discussed in greater detail in conjunction with FIGS. 1 and 2a. Referring now to FIG. 1, there is shown a conventional solid state random access main memory 1 which stores instruction and data. Main memory address register 2, stores the address of the location in memory that receives information from data out register (DOR) 3 when the op-code of the instruction requests a write operation into main memory. It also stores the address of the location in main memory 1 that provides information to data in register (DIR) 4 when the op-code of the instruction calls for a read operation. DIR 4 stores signals representing an instruction to be executed under control of the ROM system. The instruction is decoded in instruction decode logic unit 10, and 10 bits representing a ROM address are selected by switch 8 thus providing an address in ROM 5. The switch 8 is a dual 4 line to 1 line multiplexor of the SN74153 type which is described on pages 9-351 through pages 9-364 of the Integrated Circuits Catalog for Design Engineers, published by Texas Instruments Inc. Since it is required that switch 8 be able to switch at least 10 bits, 5 of these dual units are utilized, with each unit switching 2 bits. Microwords are stored in read only memory (ROM) 5 which is comprised of 4 banks of memory ROM A through ROM D each bank comprised of 1,024 words, each word comprising 36 bits plus 4 additional parity bits. (It should be noted that the ROM memory system is a typical memory system and other types of ROM's with different size words may also be utilized to practice the invention). Each microword in ROM 5 is addressed by a 12 bit address word. The first 2 bits 0 and 1 of ROSAR register 9, provide the address of the bank of ROM 5 whereas the 10 bits 2-4 from switch 8 provide the address within a particular bank. A microword address by a ROM address word is read into ROM local register (RSLR) 7. A microword in RSLR 7 is made up of various control bits which are sent to different subsystems where specific control functions are performed depending upon the bit configurations. These control functions other than the "splatter bit" which is the predetermined bit in bit position 3 are not described further in this application since they are not pertinent to the invention. However, to gather the flavor of the various type of control bits that perform various control functions that are read into RSLR 7, FIGS. 4a and 4b are provided. These formats are typical and there may be other 36 bit formats in a conventional microword for the ROM. What is not typical in these formats is the S bit in bit position 3 of FIGS. 4a and 4b and is denoted the "splatter bit" and is a feature of this invention. As previously noted, the other bits such as the group of bits comprising the fixed data 52, the variable data 53, etc., are not pertinent to the invention and are not herein further described.

Concurrently with the reading out of the 10 bits of an instruction indicating the address of the first word in ROM 5 of the microprogram to be executed, these 10 bits are also read into ROSAR register 9 after it has been incremented in the arithmetic and logic unit (ALU) 17 by 1; thus, ROSAR register 9 holds the address of the next microinstruction of the microprogram sequence to be executed. When the microinstruction is read into (RSLR) 7 under control of a ROM address word, it will be executed by the microprogram control unit (not shown) unless it is a branch instruction similar to that of FIG. 4b whereupon the last 10 bits of the branch instruction are transferred to the ROM via path 14 and switch 8. The last 10 bits represent the new branch address and accordingly the executing microprogram begins at the new address provided.

Additionally, the 10 branch bits representing the address of the first instruction in the microprogram to be executed are stored in ROSAR register 9 after once again having been incremented by 1 in ALU 17. On successive cycles which typically occur every 200 nanoseconds, the ROSAR register 9 sends 10 bits through switch 8 to the ROM and in the process ROSAR register 9 is incremented by 1 by ALU 17 over paths 13, 10 and 16. Hence, it is seen that after the address of the first microinstruction is provided, the address of succeeding microinstructions is provided via ROSAR register 9 every 200 nanoseconds under control of clock 18 and thus the microprogram is executed until a microword in the executing microprogram causes a select signal 20 to connect another address source through switch 8. The termination of one microprogram and the beginning of another microprogram under conventional ROM, is further described in connection with FIG. 2a.

Figure 2A:
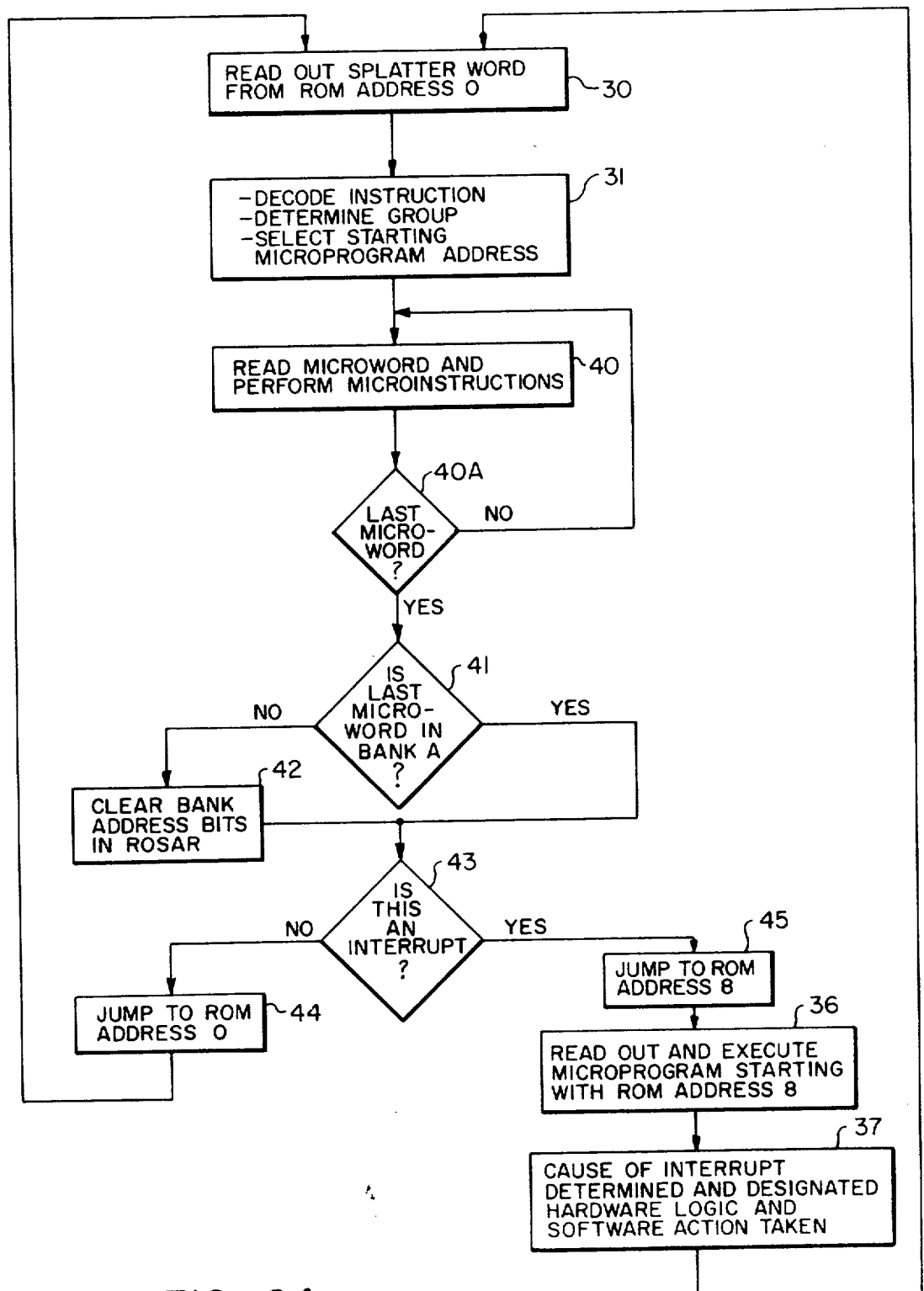
FIG. 2a is a flow diagram of the prior art method for initializing the ROM system to address zero for initiating the execution of a new instruction; or for initiating the system to a new ROM address 8 for handling an interrupt.

Referring to FIG. 2a, blocks 31 and 40 have already been described supra. Block 20 describes the initial step in performing any microinstruction sequence in a microprogram, this first step always starts at address 0 of bank A of ROM 5. At this address is stored a "splatter word" which is a word which is necessary to initialize the system. It is not the first instruction in the microinstruction series of the microprograms. The splatter word is utilized to perform some of the following typical initializing functions selecting starting address, directs bus interface unit to read memory, forms read memory effective address. It is not essential to the invention to known what functions and how it performs; however, it is important that prior to the execution of a new microinstruction sequence the control unit must always return to address 0 in order to access the "splatter word." In the conventional system, this return to address 0 requires either 1 or 2 steps depending on whether the last microinstruction that was executed was in bank A or banks B, C or D. If the last microword of the last microinstruction executing was in banks B, C or D, the system must first branch to address 0 of each bank which comprises 1 step, and then must be pointed to address 0 of bank A. Hence, it is seen 2 steps are required to reach address 0 of bank A. If, on the other hand the last microword of the last microinstruction executing was in bank A, it is obvious that only 1 step is necessary to reach address 0. Additionally, if an interrupt signal is present when the last microword of the last microinstruction is detected, a branch is necessary to another address where the first word of a microprogram is available to execute the microprogram to handle the interrupt. The interrupt causes the logic to read out the contents of address 8 instead of address 0. Address 8 is the address of the first microword of the microprogram to process the interrupt.

Continuing on FIG. 2a with the remainder of the conventional steps, a decision of whether or not the word to be executed is the last microword is made on step 40A. If it is not, the program continues as described supra until finally the last microword is reached. A determination is made indicated by decision block 41 whether or not the last microword is in bank A. If it is not, the last microword in bank A, the bank address bits, bits 0 and 1 of ROSAR register 9 are cleared to 0 as indicated in block 42. If, on the other hand, it is the last microword and it is in bank A, then a decision is made as to whether or not this is an interrupt as indicated by decision block 43. If it is not an interrupt, then a jump is made to ROM address 0 as indicated by block 44. So far it has been seen that at least 2 additional steps have been involved in reaching address 0 in bank A of ROM 5. If, on the other hand this is an interrupt, the steps indicated by blocks 45, 36 and 37 are executed, wherein there is a jump to octal address 8, which stores the first microword of the interrupt microprogram.

The invention eliminates the need for these extra 2 steps and also the need for storing an address at the 0 position of all the banks of ROM 5; hence, not only are 2 extra steps saved but also ROM address space is saved.

Figure 1A:
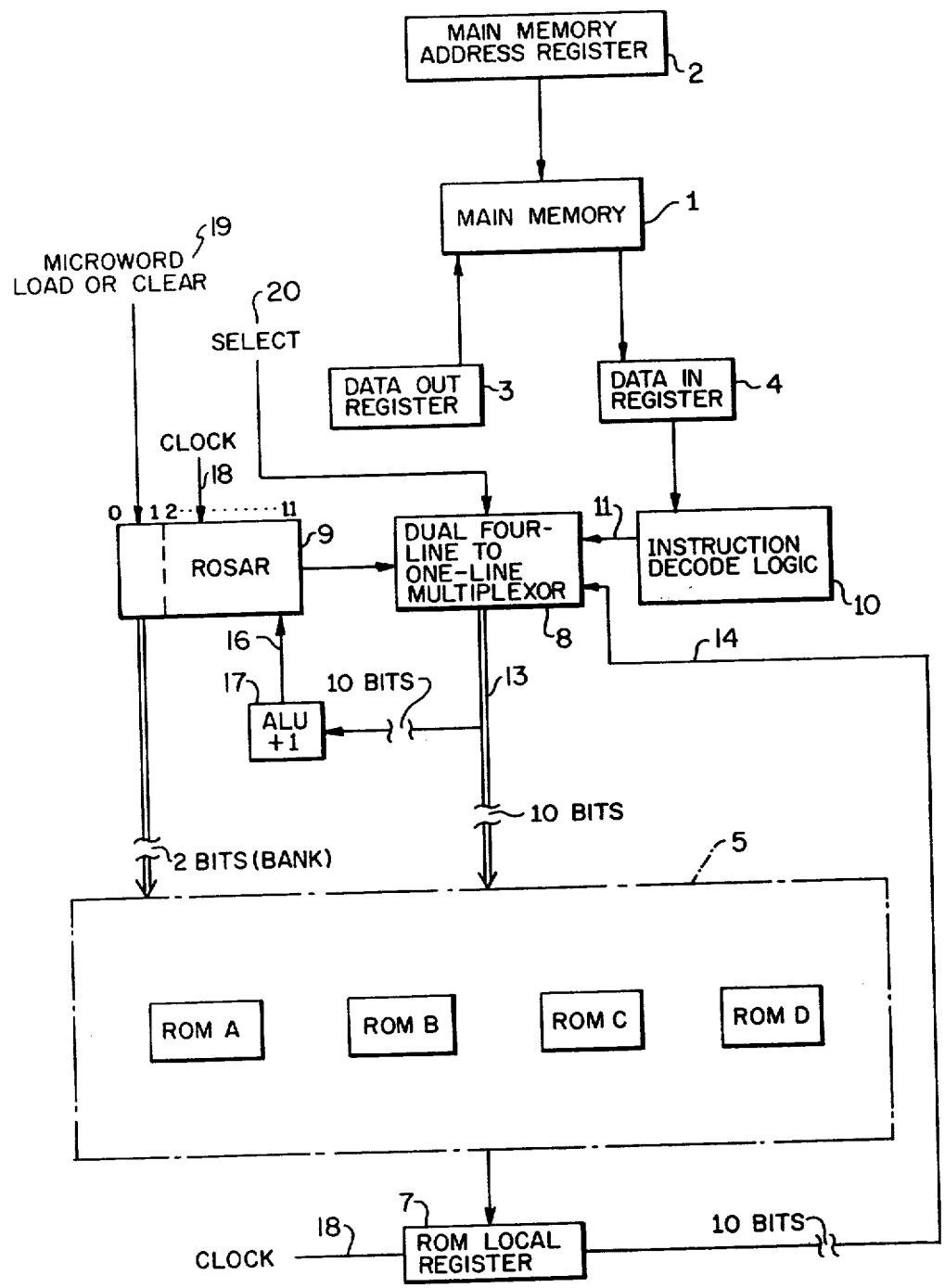
Figure 2B:
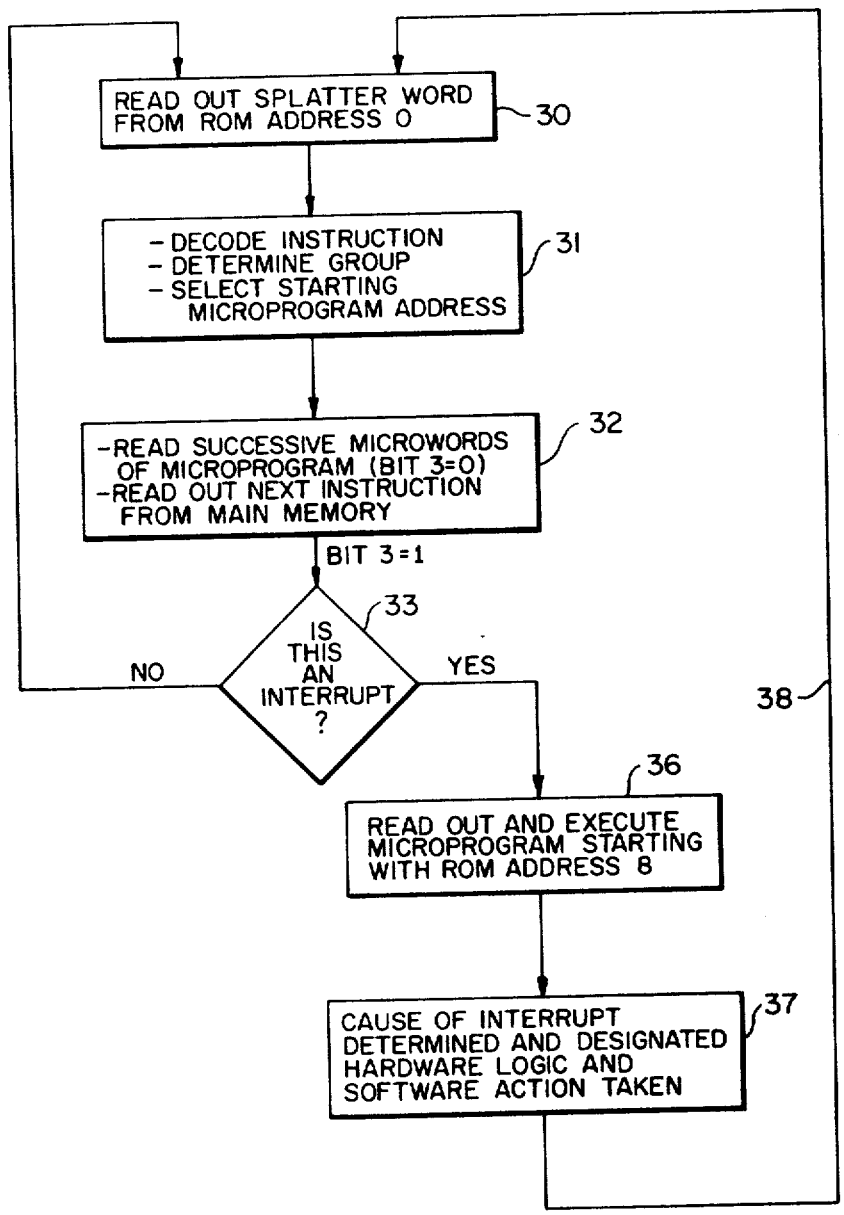
FIG. 2b is a flow diagram of the invention.
Figure 3:
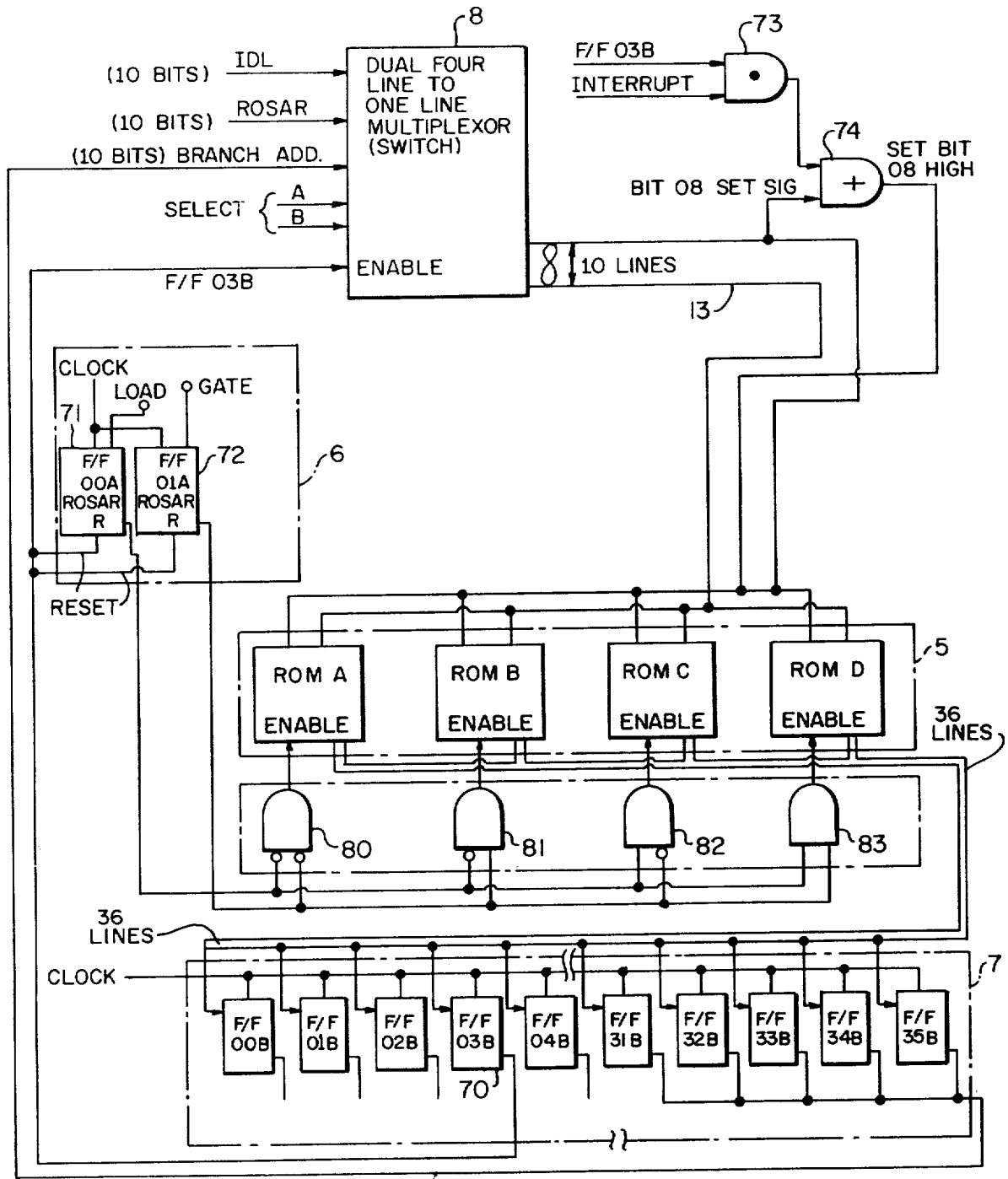
FIG. 3 is a logic block diagram of the invention.

Referring now to FIGS. 1a, 2b and 3, the structure and operation of the invention will be described wherein the differences between the prior art will become obvious. Referring to FIG. 2b first, it will be seen that steps 30 and 31 are exactly the same steps as in FIG. 2a. Step 32 differs in that the microwords read out and executed have a predetermined bit at bit position 4 i.e. the 3 bit or splatter bit. (See FIGS. 4a and 4b). When this 3 bit at bit position 4 is set to 0, it indicates that a microword being executed is not the last microword of the microprogram and accordingly the microprogram continues. However, when the "3 bit or splatter bit" is set to 1, it indicates that this is the last microword of the microprogramming sequence and accordingly responsive to this bit the hardware of FIGS. 1a and 3 automatically sets the ROM address to 0 (to be described fully infra) thus eliminating additional steps. However, before setting the ROM address to 0, a determination is made whether or not this is an interrupt as indicated by decision block 33 and if it is steps 36 and 37 of FIG. 2b are performed.

Referring to FIG. 1a, it will be seen that it is substantially the same as FIG. 1 with one major difference — it does not have a ROM address register 6 as in FIG. 1.

Referring now to FIG. 3, a detailed description of the hardware for automatically clearing ROSAR bits 0 and 1 and switch 8 to 0 if the last microword is not an interrupt and also for automatically providing the address of the first word of the interrupt microinstruction sequence if there is an external interrupt signal present. Referring to FIG. 3 and also to FIGS. 1 and 1a, the commercially available switch 8, ROSAR bits 0 and 1, ROM 5 and ROM local register 7 are the same. Since it is required that the dual 4 line to 1 line multiplexor, switch 10 bits, 5 of these commercially available units are required since each unit is a dual unit. Hence, 10 bits on 10 separate lines are provided as input information from the IDL unit 10, ROSAR register 9 and branch address from (RSLR) 7. Two select lines A and B are sufficient to address any of the 4 switch positions that is required to be selected. The truth table on page 9-351 of the Texas Instruments Catalog from which the dual 4 line to 1 line multiplexors are available, indicates that when the enable terminal is high, all the output terminals are low for binary 0. Hence, when flip-flop 03B goes high indicating that this is the last microword of the microinstruction sequence, the enable terminal of switch 8 goes high, thus causing the 10 output lines 13 of switch 8 to go low. At the same time when flip-flop F/F 03B goes high, the reset terminals of flip-flops ROSAR 00A and 01A are reset and those flip-flops go low. Hence, upon the sensing of a high bit in bit position 3 of the last microinstruction word, the ROM address is set to 0 without any additional steps.

If an interrupt signal is present however, it will be applied as one input signal to AND gate 73. The other input signal from AND gate 73 will be the signal from flip-flop 03B. When the number 3 bit or flip-flop 03B is high and an interrupt signal is present, AND gate 73 will be enabled which will in turn provide a high input signal to OR gate 74 thus providing a high output signal from OR gate 74 which is then applied to the number 8 position of the ROM address thus indicating that this is an interrupt and instead of forming ROM address 000000000000 it sets it to address 00000001000 which is octal 8 the location in ROM of the first word of the microprogram to handle an interrupt. Hence, it is seen that the apparatus automatically sets the ROM address to either 0 or octal 8 in response to the 3 bit or the 3 bit in connection with an interrupt signal.

What is claimed is:

1. In a data processing system for sequentially executing instructions and having a main memory and a plurality of read only memories (ROM's), each ROM for storing a plurality of microprograms each microprogram comprised of a plurality of microwords with each microword comprised of a plurality of bits, any of said microwords stored in said plurality of ROM's being addressed by a predetermined number of coded bits of at least one of said instructions stored in said main memory, any ROM of said plurality of ROM's being addressed by a first set of bits of said predetermined number of coded bits, any microword of said plurality of microwords within said any ROM being addressed by a second set of bits of said predetermined number of coded bits, said data processing system further comprised of a ROM-local register (RSLR) coupled to said plurality of ROM s for storing any one of said microwords addressed by said predetermined number of coded bits of said at least one of said instructions, an apparatus for initializing said plurality of ROM's prior to the execution of each microprogram comprising:

(a) first means, coupled to said main memory for decoding said predetermined number of coded bits of said at least one of said instructions;

(b) second means, coupled to said first means and to said plurality of ROM's, for selecting from said first means the predetermined number of coded bits of said at least one of said instructions for addressing any one of said microwords; and, (c) third means, coupled to said RSLR, said plurality of ROM's and said second means responsive to a predetermined bit in the microword stored in said RSLR for determining whether or not said microword stored in said RSLR is the last microword of the microprogram.

2. The apparatus as recited in claim 1 including fourth means coupled to said plurality of ROM's and to said RSLR for selecting one of said plurality of ROM's in response to said first set of bits.

3. The apparatus as recited in claim 2 including fifth means coupled to said RSLR and said second means, and responsive to said predetermined bit in said RSLR for disabling said second means, whereby all bits of said predetermined number of coded bits of said at least one instruction are set to zero in said second means.

4. The apparatus as recited in claim 3 including sixth means coupled to said plurality of ROM's and said second means and responsive to an external interrupt signal for generating an interrupt address in said plurality of ROM's, said interrupt address being the address where a first microword of a microprogram is located for handling external interrupts.

5. The apparatus as recited in claim 4 wherein said RSLR is comprised of flip-flops with each flip-flop having a "zero" output terminal and a "one" output terminal, and wherein said second means includes disabling means for setting all bits of said at least one of said instructions to zero, and wherein a predetermined one of said flip-flops has its "one" terminal coupled to said disabling means.

6. The apparatus as recited in claim 5 wherein the "one" terminal of said predetermined one of said flip-flops is also coupled to said fourth means for setting said fourth means to zero when said "one" terminal of said predetermined one of said flip-flops is high.

7. The apparatus as recited in claim 6 wherein said fourth means is comprised of flip-flops each flip-flop having a reset terminal for setting it to a zero state (i.e. low), and said one terminal of said predetermined one of said flip-flops is coupled to the reset terminal of said flip-flops.

* * * * *